United States Patent [19]

Goldman

[11] 4,078,174

[45] Mar. 7, 1978

[54] NEUTRON BOREHOLE LOGGING CORRECTION TECHNIQUE

[75] Inventor: Leonard H. Goldman, Princeton, N.J.

[73] Assignee: Schlumberger Technology Corporation, New York, N.Y.

[21] Appl. No.: 709,462

[22] Filed: Jul. 28, 1976

Related U.S. Application Data

[63] Continuation of Ser. No. 549,582, Feb. 13, 1975, abandoned.

[51] Int. Cl.² ............................................... G01V 5/00
[52] U.S. Cl. ..................................... 250/270; 250/256
[58] Field of Search ........................................ 250/270

[56] References Cited

U.S. PATENT DOCUMENTS

| | | | |
|---|---|---|---|
| 2,910,591 | 10/1959 | Baker | 250/270 |
| 3,065,346 | 11/1962 | Dewan et al. | 250/270 |
| 3,772,513 | 12/1973 | Hall et al. | 250/270 |
| 3,780,303 | 12/1973 | Smith et al. | 250/270 |
| 3,800,150 | 3/1974 | Givens | 250/270 |

*Primary Examiner*—Harold A. Dixon

[57] ABSTRACT

In accordance with an illustrative embodiment of the present invention, a method and apparatus is disclosed for logging earth formations traversed by a borehole in which an earth formation is irradiated with neutrons and gamma radiation produced thereby in the formation and in the borehole is detected. A sleeve or shield for capturing neutrons from the borehole and producing gamma radiation characteristic of that capture is provided to give an indication of the contribution of borehole capture events to the total detected gamma radiation. It is then possible to correct from those borehole effects the total detected gamma radiation and any earth formation parameters determined therefrom.

10 Claims, 7 Drawing Figures

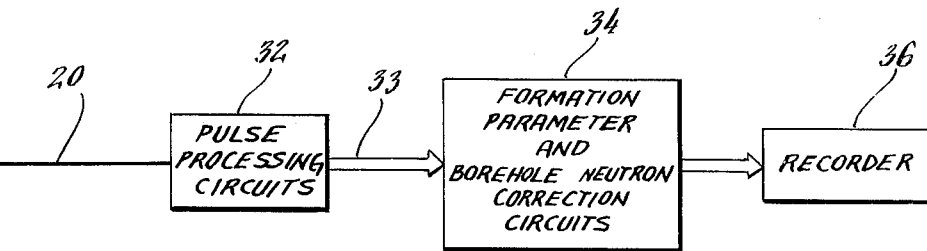
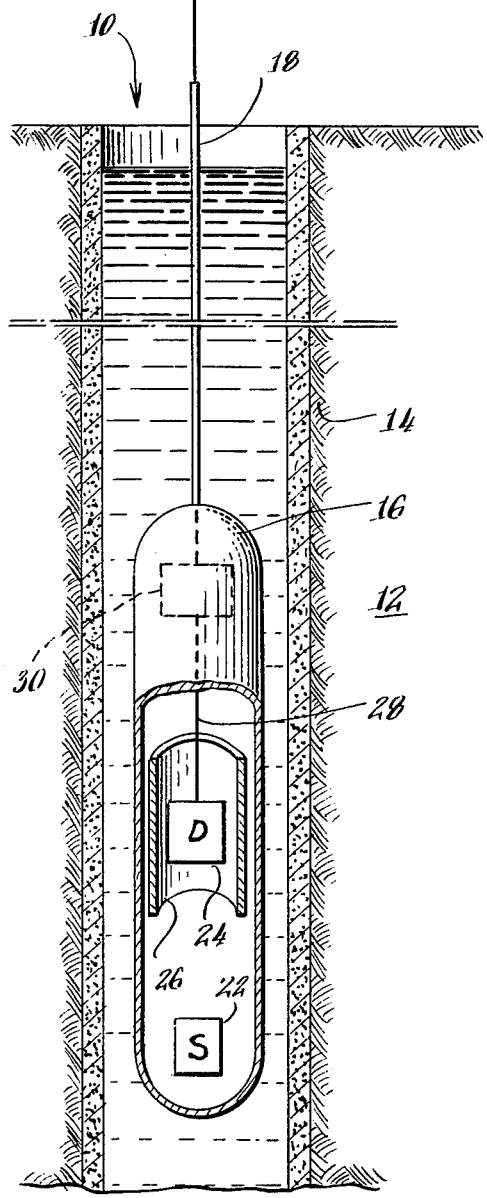
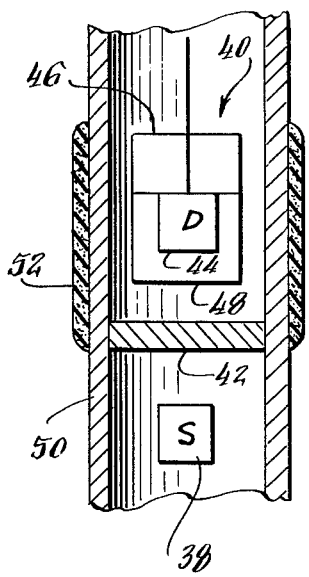
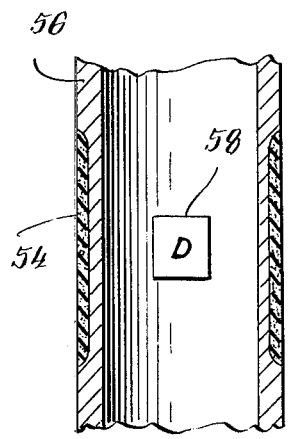

NEUTRON BOREHOLE LOGGING CORRECTION TECHNIQUE

This is a continuation of application Ser. No. 549,582 filed Feb. 13, 1975, now abandoned.

BACKGROUND OF THE INVENTION

The present invention concerns neutron logging techniques and, more specifically, a method and apparatus for correcting a detected spectrum of gamma radiation from the distorting effects of gamma radiation produced by the capture of thermal neutrons in a borehole.

It is well known that the presence of oil or gas in an earth formation can be detected by examining the spectrum of gamma radiation received from the formation after it has been irradiated with neutrons. The interactions between the neutrons and the formation nuclei by which the gamma radiation is produced are also well known. Commonly, such gamma ray spectra are obtained by passing a neutron source through a borehole and measuring the intensity of the resultant gamma radiation as a function of borehole depth.

When using such logging techniques, and particularly when it is desired to monitor the production of capture gamma radiation from the formation, significant errors are caused by capture gamma rays produced in the borehole. Such borehole capture gamma radiation is formed by scattered neutrons that decay to thermal energy levels and reenter the borehole to be captured by the borehole fluid, by the pressure housing and by the borehole casing if such is present. The problem is particularly acute with hydrogen, in which case the borehole signal is usually larger than the signal from the earth formation.

SUMMARY OF THE INVENTION

It is, therefore, an object of the present invention to provide a new and improved radioactivity logging apparatus for detecting gamma radiation and providing an indication of borehole thermal neutrons.

It is a further object of the present invention to provide a method and apparatus for correcting an earth formation parameter representation derived from a detected gamma radiation spectrum from the distorting effects of gamma radiation produced by the absorption of thermal neutrons in the borehole.

It is a still further object of the present invention to provide a method and apparatus for using an indication of borehole thermal neutron flux to correct an earth formation parameter representation derived from a detected gamma radiation spectrum.

There is provided, therefore, in accordance with the present invention, a method and apparatus for logging earth formations traversed by a borehole in which the earth formation is irradiated with neutrons and gamma radiation produced thereby in the formation and in the borehole is detected. Means for capturing neutrons in the borehole and producing radiation characteristic of that capture is provided to give an indication of the contribution of borehole capture events to the total detected gamma radiation. It is then possible to correct from those borehole effects the total detected gamma radiation and any earth formation parameters determined therefrom.

An indication of the flux of thermal neutrons in the borehole is obtained by using a sleeve or shield with the sonde to produce the characteristic capture gamma radiation. Preferably, the sleeve surrounds the sonde housing to enclose the zone of the sonde containing the gamma radiation detector. Since the characteristic capture gamma radiation produced by the sleeve is to be indicative of the thermal neutron flux in the borehole, it is preferable that the material of which the sleeve is fabricated seldom be present in the borehole in anything more than trace amounts and have as uncomplicated a capture gamma ray spectrum as possible. Such a material suitable for use in a sleeve in accordance with the present invention is the element boron.

Once an indication of the borehole thermal neutron flux has been obtained, it is possible to use the indication to correct a formation parameter from the distorting effects of borehole capture produced gamma radiation. Such distortion can be significant, particularly when the parameter is a function of an element that is found both in the borehole and in the formation and that has a high capture cross-section for thermal neutrons. For example, porosity and salinity are dependent, in different relationships, on the elements chlorine and/or hydrogen, both of which have relatively high capture cross-sections and both of which may be present in an earth formation and in a borehole.

A preferred embodiment according to the present invention includes a semiconductor detector system, due to its superior energy resolution characteristics, and, between the detector system and the source of neutrons, a shield to protect the detector.

BRIEF DESCRIPTION OF THE DRAWING

Further objects and advantages of the present invention will be apparent and a better understanding of the invention will be gained from a consideration of the following description of the preferred embodiments, taken in conjunction with the appended figures of the drawing, in which:

FIG. 1 is a cross-sectional representation of a sonde in a borehole in accordance with the present invention;

FIG. 2 is a partial cross-sectional representation of a sonde in accordance with a preferred embodiment of the present invention;

FIG. 3 is a partial cross-sectional representation of a sonde in accordance with a further embodiment of the present invention;

FIG. 4 shows a portion of a gamma radiation spectrum detected using apparatus in accordance with the present invention as represented in FIG. 2;

DESCRIPTION OF THE PREFERRED EMBODIMENTS

Figure 5:
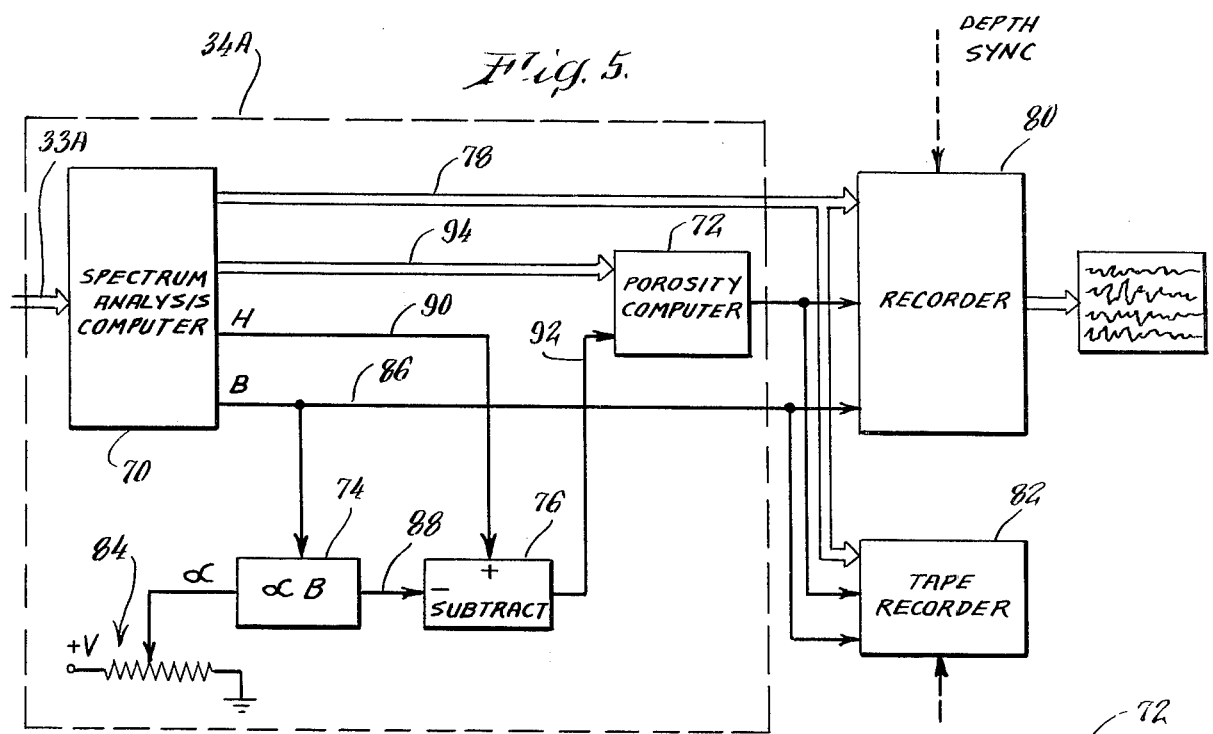
FIG. 5 is a block diagram of a system in accordance with one embodiment of the present invention.

A simplified functional representation of apparatus in accordance with the present invention may be seen by referring to FIG. 1. Shown therein in a borehole 10 in an earth formation 12 that is lined with a film or layer of mud or mudcake 14. Suspended in the borehole is a portion of a well logging system arranged and adapted to investigate preselected parameters of the surrounding earth formation 12. The well logging system includes a fluidtight hollow body member or sonde 16 which is suspended by armored cable 18 and adapted to be passed longitudinally through the borehole by use of a winch (not shown) at the earth's surface. The cable 18 may have one or more conductors 20 for transmitting electrical signals between the sonde 16 and the surface apparatus, and the electrical signals so transmitted may be recorded against a depth base by using a mechanical or electronic linkage on the winch (not shown) to control recording of the signals by the surface apparatus. In this manner a log of some earth formation parameter is produced as a function of borehole depth.

In FIG. 1, the sonde 16 includes a source of neutrons 22. A neutron source suitable for use in apparatus in accordance with the present invention, may include any of the conventional neutron sources available for well logging purposes. For example, source 22 could be a californium 252 source for providing relatively low energy neutrons for irradiating the formation, or the source 22 could be a conventional plutonium beryllium or actinium beryllium source for providing neutrons having an average energy of about 5 MeV, or, finally, source 22 could be a standard deuterium-tritium reaction accelerator for providing high-energy neutrons with an average energy of 14 MeV. If a high-energy neutron accelerator is selected, the source may be arranged to irradiate the formation with a continuous neutron output or a conventional pulsing circuit may be connected to the accelerator to permit emission of a neutron pulse of a specified duration at a predetermined interval.

The sonde 16 also includes a high resolution gamma radiation detector 24, depicted schematically in FIG. 1, for detecting capture gamma rays resulting from irradiation of the surrounding earth formations 12 by neutrons from source 22. Detector 24 may be a sodium iodide or other crystal that is optically coupled to a photomultiplier tube of suitable design (not shown) or, as will be further discussed hereinafter, detector 24 will preferably be a germanium semiconductor detector, which has energy resolution characteristics superior to a scintillation crystal-photomultiplier tube detector arrangement.

In accordance with the present invention, sonde 16 also includes a sleeve 26 that surrounds detector 24 between the detector and the region or zone of the borehole and earth formation opposite the detector from which gamma radiation could be incident on the detector. The sleeve 26 is not a barrier to gamma radiation, however, but is fabricated of a material that has a high capture cross-section for thermal neutrons, emitting capture gamma radiation characteristic of that thermal neutron capture, and that is rarely present in the borehole and in the formation in anything more than trace amounts.

In operation, neutrons emitted by the source 20 enter the formation, lose energy through either elastic or inelastic scattering in the formation, and a representative number of the scattered neutrons decay to thermal energy and reenter the borehole to be captured by the borehole casing if present, by the borehole fluid, and by the sonde itself. Since the number of thermal neutrons captured by the sleeve 26 is proportional to the thermal neutron flux in the borehole, it is possible to get an indication of that thermal neutron flux by monitoring the detection of gamma rays characteristic of the capture of thermal neutrons by the sleeve.

As will be explained in greater detail hereinafter, the constant of proportionality that relates the count rate of the detected characteristic gamma radiation to a borehole thermal neutron flux can be predetermined experimentally by test measurements taken in various known borehole configurations with the sonde for which the constant is being determined. Thereby different constants can be determined, for example, for uncased boreholes, for boreholes with various casing sizes or for boreholes drilled with mud of different densities.

As will be further explained hereinafter, it is also possible to take advantage of that proportionality to correct any detected gamma radiation derived earth formation parameter that is sensitive to gamma radiation produced by materials which are likely to be found in the borehole environment and have high thermal neutron capture cross-sections.

Advantageously, the material of which the sleeve 26 is fabricated should rarely be present in the borehole in anything more than trace amounts and should have a relatively uncomplicated capture gamma ray spectrum. For example, boron is suitable for inclusion within the sleeve 26 since it has a high capture cross-section for thermal neutrons, is seldom found in a borehole, and emits gamma radiation having an energy of 480 KeV upon the capture of a thermal neutron.

Signals from detector 24, including signals representative of detected gamma radiation characteristic of thermal neutron capture by the sleeve 26, are sent through the output conductor 28, are conditioned, and are stored in a downhole processing circuit and memory 30 for eventual time division multiplexed transmission to the earth's surface through conductor 20. A system suitable for use as a processing circuit and memory 30 with the apparatus of the present invention is disclosed U.S. Pat. No. 3,559,163 issued to Schwartz on Jan. 26, 1971 and assigned to the assignee of the present invention. In the Schwartz system, the output signals from the detector are categorized according to their amplitude by a plurality of discriminators and then counted for later readout and transmission to the surface according to a time-division multiplexing arrangement. At the surface, the pulses received by way of conductors 20 are applied to suitable pulse processing circuits 32, which may include circuits to perform the necessary amplification, decoding, pulse shaping and automatic gain control functions.

As will be further explained hereinafter, the demultiplexed outputs from pulse processing circuits 32 are applied via conductor bundle 33 to formation parameter and borehole neutron correction circuits 34, the output of which is recorded on a recording medium of a suitable recorder 36. As indicated above, recorder 36 may be controlled using a mechanical or electronic linkage on the winch (not shown) to record the output of circuits 34 as a function of borehole depth.

In the apparatus shown in FIG. 1, an indication of borehole thermal neutron flux is obtained with sleeve 26 between the detector 22 and the housing of the sonde 16. A more direct indication of borehole thermal neutron flux is obtained, however, if the sleeve is placed in direct contact with the borehole environment so as to eliminate the "screening" of borehole thermal neutrons from the sleeve by sonde materials. Furthermore, if the material chosen for fabrication of the sleeve 26 has a high capture cross-section for thermal neutrons, the detected spectrum of gamma radiation may be simplified by such placement since the sleeve will, itself, act as a screen to prevent thermal neutrons from being captured by iron and other materials in the sonde 16. In that way, fewer thermal neutrons reach the iron and other sonde materials having high capture cross-sections, and the background gamma radiation level is kept to a lower level to reduce the burdens on the pulse processing circuitry. Accordingly, the embodiment of FIG. 2 shows such a preferred sleeve arrangement.

In the embodiment of FIG. 2, the neutron source 38 is separated from the detector system 40 by means of a shield 42. While not required for operation of the sonde in accordance with the present invention, gamma radiation shield 42 isolates the detector system 40 from background gamma radiation produced by the source 38 as a byproduct of the neutron production reaction. Such spurious gamma ray emission can be considerable, particularly where chemical neutron sources are employed. In that event, any conventional gamma ray absorbing material, such as hevimet, may be used for shield 42.

If source 38 comprises a neutron accelerator providing high energy neutrons, secondary gamma radiation will not be as significant a problem. However, damage to the detector system 40 from neutron bombardment will be more likely to occur and, under those circumstances, it may be important to include within shield 42 some paraffin or other effective neutron moderating material.

Conventional detector system 40 includes a semiconductor detector 44, such as either a lithium-drifted germanium or high purity germanium semiconductor, a dewar 46 containing a cryogenic material for maintaining the semiconductor at a constant low temperature, and a housing 48 that encloses the detector 44 and serves as a vacuum chamber for insulating the detector from the high ambient temperatures generally found in borehole logging environments.

In accordance with the present invention, a sleeve 52 having the characteristics of sleeve 26 described in connection with FIG. 1 surrounds the detector system 40 and is exterior to sonde housing 50. The sleeve is formed to fit snugly around housing 50 and may be held in position by any conventional clamp or pin-type fastening arrangement. When boron is selected as the material for providing a characteristic capture gamma ray spectrum, it is convenient to manufacture sleeve 52 from a hard rubber material and to distribute the boron throughout the sleeve in the form of boron carbide.

As mentioned above, boron emits characteristic gamma radiation at an energy level of 480 KeV upon the capture of thermal neutrons, an energy level that is very close to the 511 KeV annihilation gamma radiation produced when a positron combines with a free electron. Use of a germanium semiconductor detector is particularly advantageous, therefore, since the superior energy resolution characteristics of that detector makes discrimination between the two close energy levels more easily accomplished than with a scintillation crystal/photomultiplier tube detector arrangement.

A further embodiment of apparatus in accordance with the present invention is shown in FIG. 3, in which sleeve 54 is recessed within and forms a part of sonde housing 56. In operation, detector 58 continues to receive gamma radiation emitted as a result of the capture of thermal neutrons by the sleeve 54, the borehole, and the earth formation; however, the sonde presents a smaller diameter and is less likely to become lodged in the borehole.

Shown in FIG. 4, is a portion of a gamma radiation spectrum detected using apparatus as represented in FIG. 1 having the source, detector and sleeve arrangement shown in FIG. 2. Spectra 60 represents gamma radiation incident on semiconductor 44 from all sources, including the gamma radiation produced from the capture of thermal neutrons by boron impregnated sleeve 52. The number of channels used over the energy range of interest is, of course, dependent on the desired precision of analysis and the resolution capabilities of the detector used. For example, one channel width suitable for use with a detector arrangement as shown in FIG. 2 would be in the order of 3.5 KeV per channel over the energy range of interest.

As mentioned above, boron emits gamma radiation at a single energy level of 480 KeV upon the capture of a thermal neutron, and the boron peak 62 is clearly separated from the annihilation peak 64 in spectra 60. Also visible in the spectra of FIG. 4 is a chlorine peak 66 and a hydrogen peak 68. The latter two peaks will be referred to and described further hereinafter.

As would be obvious to one skilled in the art, such sharp peak definitions suggest several approaches that may be used to extract information from recorded spectra. One such approach might include a background subtraction scheme in which the counts per channel for a preselected number of channels on either side of the peak are averaged and subtracted from the peak counts per channel to determine the count contribution from the element of interest in the particular peak. A second approach might include a peak shape weighting scheme in which the channels comprising an energy range of a particular element peak of interest are assigned coefficients that are representative of their relative significance and that result in a net zero indication in the absence of a peak, so that when the peak is present, an indication of the element contribution is obtained. A third approach might include a weighted least-squares curve fitting technique involving a plurality of standards for elements expected to be present and some criteria of goodness of fit, such as a minimum chi-square test. Regardless of the approach selected, information indicative of constituent element proportions or cncentrations in an earth formation can readily be determined from a spectrum of detected gamma radiation such as represented in FIG. 4.

Figure 6:
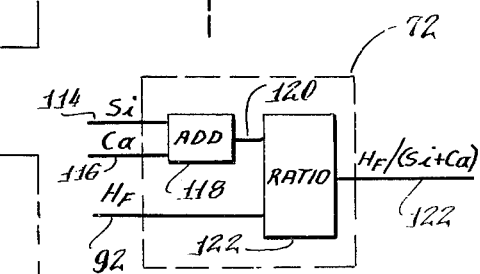
FIG. 6 is a block diagram of a porosity computer in accordance with one embodiment of the system of FIG. 5.

The block diagrams of FIGS. 5 and 6 show alternative schemes for circuits 34 and recorder 36 of FIG. 1 and represent two systems in accordance with the present invention for using the information contained in a boron peak, such as shown in FIG. 4, to correct a formation parameter from the effects of borehole neutron capture produced gamma radiation.

FIG. 5 shows one embodiment of a system in accordance with the present invention for correcting a porosity indication from the distorting effects of capture gamma radiation produced in a borehole. The amplified, decoded, and otherwise processed counts-per-channel signals from pulse processing circuits 32 are applied via conductor bundle 33A to formation parameter and borehole neutron correction circuits 34A, which includes a spectrum analysis computer 70, a porosity computer 72, multiplier 74 and subtractor 76. Computer 70 produces values indicative of the element proportions or concentrations for the various elements of interest in the formation, as well as other formation parameters of interest, such as, for example, values indicative of water saturation, shaliness, lithology, etc. The output values from computer 70 may represent counts/unit time, ratios that have meaning in comparison to comparable figures obtained from known formations, or any other measurement scheme that can be coordinated with an existing system of known measurements. Signals representative of these values are transmitted through conductor bundle 78 to a visual recorder 80 and to a tape recorder 82. The signal produced by computer 70 may be in either analog or digital form, and it is understood that if in digital form system components such as the recorder 80 include the necessary digital-to-analog converter circuits. The usual depth synchronization inputs to recorders 80 and 82 are shown diagramatically.

The computer 70 may be of any construction appropriate to the necessary spectrum analysis computations using any suitable mathematical approach. One such approach involving a weighted-least-squares mathematical technique is described in Moran et al. U.S. Pat. No. 3,521,064, assigned to the assignee of the present application. The computer 70 may comprise, for example, a general purpose digital computer and may be located at the well site, as illustrated in FIG. 1, or it may be located remotely and operate on recorded representations of counts-per-channel, such as could be made by recording the decoded signals from pulse processing circuits 32 on magnetic tape.

A ratio suitable for indicating formation porosity might, for example, take the form H/ (Si + Ca) where H, Si, and Ca are values derived from computer 70 that are representative of the proportions or concentrations of hydrogen, silicon and calcium, respectively, found in the earth formation. Since hydrogen is present in both the borehole and the formation and since hydrogen has a high capture cross-section for thermal neutrons, considerable distortion to a porosity indication could result from the capture gamma radiation produced by the capture of thermal neutrons by the hydrogen in the borehole. To correct the porosity indication in accordance with one embodiment of the present invention, therefore, the hydrogen signal, which has a first portion that is derived from borehole capture events and a second portion that is derived from capture events taking place in the earth formation, is corrected by compensating for distortion produced by borehole capture produced gamma radiation.

More specifically, the measured hydrogen signal, $H_M$, may be represented as follows:

$$H_M = H_{BH} + H_F \quad (1)$$

where $H_{BH}$ and $H_F$ represent the borehole and formation components, respectively, of the total measured hydrogen signal, $H_M$. Although $H_M$, as derived from the hydrogen peak 68 in FIG. 4, is a complicated function of the thermal neutron density in the borehole and the porosity of the formation, $H_{BH}$ is proportional to the thermal neutron flux in the borehole. Since boron is rarely present in the borehole and in the formation in anything more than trace amounts, the boron signal, B, as derived from the boron peak 62 in FIG. 4, is also proportional to the thermal neutron flux in the borehole, and, therefore, the borehole hydrogen signal and the boron signal are proportional to each other. In equation form:

$$H_{BH} = \alpha B \quad (2)$$

where $\alpha$ is a constant. Accordingly, it is possible to determine the formation hydrogen component of the measured hydrogen signal as follows:

$$H_F = H_M - \alpha B \quad (3)$$

since the boron signal can be determined from the detected spectrum as discussed above and since $\alpha$ can be experimentally determined in a zero porosity formation where there is no hydrogen in the formation and, therefore, no hydrogen signal.

As indicated hereinbefore, the constant of proportionality $\alpha$ will vary with borehole parameters, being different, for example, for 8 inch and 10 inch boreholes. Other borehole parameters include but are not limited to whether or not the borehole is cased, the density of the drilling mud used, the percentage of hydrogen in the borehole, etc. Proper values for $\alpha$ can be predetermined, however, by experimental measurements taken in known formations with known borehole conditions. Once a proper value for $\alpha$ has been determined by an operator at a well site or at a remote location that is based on the borehole conditions in which the log is or has been run, a voltage representative of the $\alpha$ determined can be selected by the operator and preset into circuits 34A by a voltage varying apparatus generally as shown at 84 in FIG. 5.

Therefore, to insure that porosity computer 72 produces a porosity indication with minimum distortion from borehole thermal neutrons, the boron signal produced by computer 70 on conductor 86 is applied to multiplier 74, which combines the boron signal with the selected value for $\alpha$ and produces one input to subtractor 76 on conductor 88. The measured hydrogen signal from computer 70 is applied to subtractor 76 by way of conductor 90, and subtractor 76 takes the difference between the measured hydrogen signal and the borehole component, $\alpha B$, and provides to porosity computer 72 a corrected value for the hydrogen signal on conductor 92 that represents the formation component of the total measured hydrogen signal as indicated in equation (3) above.

Also applied to the porosity computer 72 by way of conductor bundle 94 are the necessary silicon and calcium signals for porosity computer 72 to determine an indication of formation porosity in accordance with the ratio described above.

A simple form of computer 72, which may be used to obtain a signal representative of that ratio, is shown in FIG. 6. Signals produced by computer 70 and representative of the proportions or concentrations of silicon and calcium are applied on conductors 114 and 116, respectively, to addition circuitry 118, which totals the signals and produces a signal representative of the total on conductor 120 as one input to ratio circuitry 122. The other input to ratio circuitry 122 is the corrected hydrogen signal, $H_F$, on conductor 92. The output from ratio circuitry 122 is a signal representative of the formation porosity and may be applied to visual recorder 80 and/or tape recorder 82 as shown in FIG. 5.

The formation porosity indication may be determined with any suitable ratio, and the present invention is not limited to the particular ratio discussed above. Moreover, calculation of the borehole component $\alpha B$ is not limited to being performed in the multiplier and subtractor circuits shown in FIG. 5 but may be accomplished in a suitably programmed general purpose digital computer after selection of the proper constant of proportionality, $\alpha$.

Figure 7:
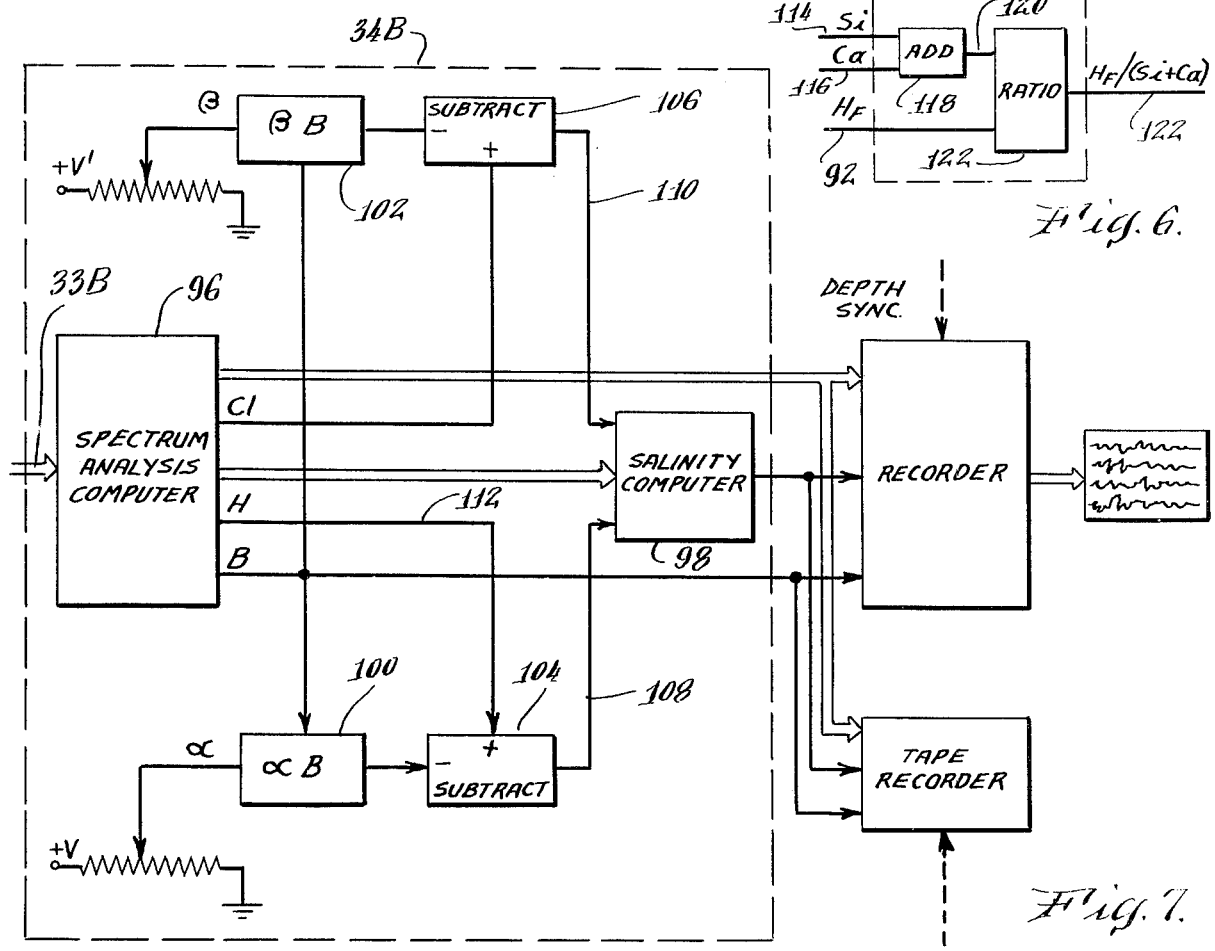
FIG. 7 is a block diagram of a system in accordance with a further embodiment of the present invention.

FIG. 7 shows a second embodiment of a system in accordance with the present invention for correcting a salinity indication from the distorting affects of borehole neutron capture produced gamma radiation. In the salinity correction embodiment, signals from pulse processing circuit 32 are applied via conductor bundle 33B to formation parameter and borehole neutron correction circuits 34B, which includes a spectrum analysis computer 96, a salinity computer 98, multipliers 100 and 102, and subtractors 104 and 106.

Illustratively, a ratio useful in deriving an indication of salinity might be Cl/H, where Cl and H are values derived from computer 96 that are representative of the proportions or concentrations of chlorine and hydrogen, respectively, found in the earth formation. As with hydrogen, chlorine is present in both the borehole and the formation and has a high capture cross-section for thermal neutrons. Correction of the measured chlorine signal along with the hydrogen signal, therefore, will result in a salinity indication with less distortion than if the measured value had been used without correcting for borehole chlorine effects.

The chlorine signal, as with the hydrogen signal, has a first portion that is derived from borehole capture events and a second portion that is derived from capture events taking place in the earth formation, and it is possible, therefore, to determine the formation chlorine component of the measured chlorine signal according to the following relationship:

$$Cl_F = Cl_M - \beta B \qquad (4)$$

where $\beta$ is a constant of proportionality that can be experimentally determined in a manner similar to the procedure used to determine $\alpha$. Measurements of the detected chlorine signal are taken in known zero salinity formations with varying borehole parameters. As with the constant $\alpha$, the constant of proportionality $\beta$ will vary with borehole parameters such as borehole diameter, the presence of borehole casing, the percentage of chlorine in the borehole, etc. Once proper values of $\alpha$ and $\beta$, based on the borehole conditions in which the log is being run have been determined, the hydrogen and chlorine signals from computer 96 can be corrected according to the connections shown in FIG. 6 and applied to salinity computer 98 by way of conductors 108 and 110, respectively. In the event that the salinity indication ratio described above is chosen to derive an indication of formation salinity, salinity computer 98 may take the form of a simple ratio circuit with one input being the corrected hydrogen signal, $H_F$, the second input being the corrected chlorine signal, $Cl_F$, and the $Cl_F/H_F$ ratio representative output being applied to the visual and tape recorders as shown in FIG. 7. Thereby, a more accurate representation of the formation salinity is obtained from the spectrum of detected gamma radiation.

As shown in FIG. 7, additional signals may be applied to computer 98 via conductor bundle 112 in the event that a salinity indication ratio is chosen that includes elements other than hydrogen and chlorine.

Although the invention has been described with reference to specific embodiments thereof, many other variations and modifications of the invention will be apparent to those skilled in the art without departing from the spirit and scope of the invention.

For example, the sleeve material is not limited to boron or boron carbide but may comprise any material having an uncomplicated capture gamma ray spectrum that is seldom found in the borehole and in the formation in anything more than trace amounts, and the specific formation parameters selected to be corrected are not limited to porosity and salinity but could comprise any formation parameter in which one element necessary to determine the parameter is present in both the borehole and the formation and has a thermal neutron capture cross-section that is large enough to distort the parameter determination in the absence of some corrective measures. Furthermore, the constant of proportionality is not limited to selection in a variable voltage apparatus as that described but may be performed in any suitable automatic selection process such as an appropriately programmed general purpose digital computer. Moreover, once a signal representative of borehole thermal neutron flux has been obtained in accordance with the invention, it may also be used in conjunction with a borehole standard spectrum in a weighted-least-squares curve fitting approach as described in the Moran et al. patent.

The above described embodiments are, therefore, intended to be merely exemplary and all such variations and modifications are intended to be included within the scope of the invention as defined in the appended claims.

I claim:

1. Apparatus for logging earth formations traversed by a borehole comprising a housing, a source of neutrons in said housing, at least one gamma radiation detector in said housing that is spaced apart from said source, means surrounding said detector that includes a material rarely present in a borehole and in earth formations in anything more than trace amounts for capturing neutrons from a borehole and for producing gamma radiation characteristic of that neutron capture for detection by said gamma radiation detector, means coupled to said detector for producing a representation of the neutron flux in the borehole in selective response to the amount of detected characteristic gamma radiation from said material and a representation of the concentration of a formation constituent element in response to detected gamma radiation, means for producing a representation of a constant of proportionality reflecting the relationship between predetermined representations of the concentration of said element and the neutron flux in a formation which does not contain said element, means for multiplying the produced neutron flux representation by said constant of proportionality to obtain an indication of the effect of borehole neutron capture produced gamma radiation on the produced element concentration representation, and means for subtracting said borehole effect indication from said produced element concentration representation.

2. Apparatus according to claim 1 wherein said detector surrounding means comprises a sleeve attached to and surrounding said housing opposite said gamma radiation detector.

3. Apparatus according to claim 2 wherein said sleeve has the element boron distributed therethrough.

4. Apparatus according to claim 1 wherein said detector surrounding means comprises a shield positioned between said detector and said housing.

5. Apparatus according to claim 4 wherein said sleeve has the element boron distributed therethrough.

6. A method for logging earth formations traversed by a borehole comprising the steps of passing a sonde having a source of neutrons and at least one gamma radiation detector therein through an earth formation traversed by a borehole, irradiating said earth formation with neutrons, detecting gamma radiation produced by neutron activity surrounding said sonde, providing a means for capturing neutrons from a borehole to produce gamma radiation characteristic of that neutron capture, said capturing means including a material that is rarely present in a borehole and in earth formations in anything more than trace amounts, producing a representation of the neutron flux in the borehole in selective response to the amount of detected characteristic gamma radiation from said material, producing a representation of the concentration of a formation constituent element in response to detected gamma radiation, producing a representation of a constant of proportionality reflecting the relationship between predetermined representations of the concentration of said element and the neutron flux in a formation which does not contain said element, multiplying the produced neutron flux representation by said constant of proportionality to obtain an indication of the effect of borehole neutron capture produced gamma radiation on the produced element concentration representation, and subtracting said borehole effect indication from said produced element concentration representation.

7. A method for correcting a representation of the concentration of an earth formation constituent element derived from a logging sonde adapted to pass through a borehole while emitting neutrons into and detecting gamma radiation from a borehole, comprising the steps of capturing thermal neutrons from a borehole with a material that is rarely present in a borehole and in earth formations in anything more than trace amounts to produce gamma radiation characteristic of that thermal neutron capture, detecting said characteristic gamma radiation, producing a representation of the thermal neutron flux in the borehole in selective response to the amount of detected characteristic gamma radiation from said capturing material, producing a representation of a constant of proportionality reflecting the relationship between predetermined representations of the concentration of said element and the neutron flux in a formation which does not contain said element, multiplying the produced neutron flux representation by said constant of proportionality to obtain an indication of the effect of borehole neutron capture produced gamma radiation on said derived element concentration representation, and subtracting said borehole effect indication from said derived element concentration representation to minimize the effects of borehole neutron capture produced gamma radiation on said concentration representation.

8. Apparatus for logging earth formations traversed by a borehole, comprising a housing, a source of neutrons in said housing, a gamma radiation detector in said housing that is spaced apart from said source, a boron sleeve surrounding said detector for capturing neutrons from the borehole and producing gamma radiation characteristic of that neutron capture for detection by the detector, a spectrum analysis computer coupled to said detector for producing a first signal representative of the amount of characteristic radiation produced by the boron sleeve and at least a second signal representative of the concentration of a given element in the formation, means for producing a signal representing a constant of proportionality reflecting the relationship between predetermined values of said first and second signals in a formation which does not contain said element, means for multiplying said first produced signal by said proportionality constant signal to obtain a signal representative of the effect of borehole neutron capture produced gamma radiation on said second produced signal, and means for subtracting said borehole effect signal from said second produced signal.

9. Apparatus for logging earth formations traversed by a borehole, comprising a housing, a source of neutrons in said housing, a gamma radiation detector in said housing that is spaced apart from said source, a boron sleeve surrounding said detector for capturing neutrons from the borehole and producing gamma radiation characteristic of that neutron capture for detection by the detector, a spectrum analysis computer coupled to said detector for producing a signal representative of the amount of characteristic radiation produced by the boron sleeve and signals representative of the concentrations of hydrogen, silicon and calcium respectively in the formation, means for producing a signal representing a constant of proportionality reflecting the relationship between predetermined values of the hydrogen and boron sleeve signals in a formation which does not contain hydrogen, means for multiplying said produced boron sleeve signal by said proportionality constant signal to obtain a signal representative of the effect of borehole neutron capture produced gamma radiation on said produced hydrogen signal, means for subtracting said borehole effect signal from said produced hydrogen signal to obtain a corrected hydrogen concentration signal, and means for combining the corrected hydrogen signal with the silicon and calcium signals to produce a representation of the formation salinity.

10. Apparatus for logging earth formations traversed by a borehole, comprising a housing, a source of neutrons in said housing, a gamma radiation detector in said housing that is spaced apart from said source, a boron sleeve surrounding said detector for capturing neutrons from the borehole and producing gamma radiation characteristic of that neutron capture for detection by the detector, a spectrum analysis computer coupled to said detector for producing a signal representative of the amount of characteristic gamma radiation produced by the boron sleeve and signals representative of the concentrations of hydrogen and chlorine in the formation, means for producing a signal representing a first constant of proportionality representing the relationship between predetermined values of the hydrogen and boron sleeve signals in a formation which does not contain hydrogen, means for multiplying said produced boron sleeve signal by said first proportionality constant signal to obtain a signal representative of the effect of borehole neutron capture produced gamma radiation on said produced hydrogen signal, means for subtracting said hydrogen borehole effect signal from said produced hydrogen signal to obtain a corrected hydrogen concentration signal, means for producing a signal representing a second constant of proportionality representing the relationship between predetermined values of the chlorine and boron sleeve signals in a formation which does not contain chlorine, means for multiplying said produced boron sleeve signal by said second proportionality constant signal to obtain a signal representative of the effect of borehole neutron capture produced gamma radiation on said produced chlorine signal, means for subtracting said chlorine borehole effect signal from said produced chlorine signal to obtain a corrected chlorine concentration signal, and means for combining the corrected hydrogen and chlorine signals to produce a representation of the formation salinity.

* * * * *